United States Patent
Chen et al.

(10) Patent No.: US 8,525,428 B2
(45) Date of Patent: Sep. 3, 2013

(54) POWER SUPPLY APPARATUS AND METHOD FOR A BACKLIGHT SYSTEM

(75) Inventors: Fan Chen, Shanghai (CN); Xin Wu, Shanghai (CN); Chaoqun Sun, Shanghai (CN); Qanqing Wu, Shanghai (CN)

(73) Assignee: BCD Semiconductor Manufacturing Co. Ltd., George Town (KY)

( * ) Notice: Subject to any disclaimer, the term of this patent is extended or adjusted under 35 U.S.C. 154(b) by 220 days.

(21) Appl. No.: 12/986,960

(22) Filed: Jan. 7, 2011

(65) Prior Publication Data
US 2012/0025720 A1 Feb. 2, 2012

(30) Foreign Application Priority Data

Jul. 27, 2010 (CN) .......................... 2010 1 0240521

(51) Int. Cl.
| | |
|---|---|
| H05B 37/02 | (2006.01) |
| H05B 39/04 | (2006.01) |
| H05B 41/36 | (2006.01) |
| H05B 39/02 | (2006.01) |
| H05B 41/16 | (2006.01) |
| H05B 41/24 | (2006.01) |
| H05B 37/00 | (2006.01) |
| H05B 39/00 | (2006.01) |
| H05B 41/00 | (2006.01) |
| G01F 1/00 | (2006.01) |
| H02M 3/335 | (2006.01) |

(52) U.S. Cl.
USPC ........ 315/219; 315/209 R; 315/246; 315/254; 315/291; 315/312; 363/16; 363/25

(58) Field of Classification Search
None
See application file for complete search history.

(56) References Cited

U.S. PATENT DOCUMENTS

| | | | | |
|---|---|---|---|---|
| 5,998,930 | A | * | 12/1999 | Upadhyay et al. ............ 315/106 |
| 6,320,764 | B1 | * | 11/2001 | Jiang et al. ....................... 363/17 |
| 7,285,919 | B2 | * | 10/2007 | Newman et al. ............... 315/224 |
| 2007/0126367 | A1 | * | 6/2007 | Zhou et al. ................ 315/209 R |
| 2007/0216322 | A1 | * | 9/2007 | Kim .............................. 315/312 |
| 2010/0109571 | A1 | * | 5/2010 | Nishino et al. ................ 315/307 |
| 2011/0181205 | A1 | * | 7/2011 | Chung .......................... 315/307 |

FOREIGN PATENT DOCUMENTS

| | | |
|---|---|---|
| CN | 2554861 Y | 6/2003 |
| CN | 101330785 A | 12/2008 |
| CN | 201252662 Y | 6/2009 |
| EP | 2204898 A1 | 7/2010 |

OTHER PUBLICATIONS

Office Action of Chinese Application No. 201010240521.6, dated Sep. 6, 2012, 10 pages total (English translation not included).

* cited by examiner

*Primary Examiner* — Douglas W Owens
*Assistant Examiner* — Dedei K Hammond
(74) *Attorney, Agent, or Firm* — Kilpatrick Townsend & Stockton LLP

(57) ABSTRACT

A power supply system includes a transformer having a primary winding on its primary side for coupling to a power source and one or more secondary windings on its secondary side. A first control circuit is disposed on the primary side of the transformer for controlling a current flow in the primary winding. A second control circuit disposed on the secondary side of the transformer, and the second control circuit is configured to provide a regulated output voltage. In the power supply system, the first control circuit is configured to generate a control signal for controlling the current flow in the primary winding without using a feedback control signal from the secondary side of the transformer.

20 Claims, 7 Drawing Sheets

POWER SUPPLY APPARATUS AND METHOD FOR A BACKLIGHT SYSTEM

CROSS-REFERENCES TO RELATED APPLICATIONS

This application claims benefit and priority of Chinese Patent Application No. 201010240521.6, filed Jul. 27, 2010, commonly owned and incorporated herein by reference in its entirety for all purposes.

BACKGROUND OF THE INVENTION

The present invention relates to power supply system, and more particularly, embodiments of the invention relate to a power supply system having a controller without having a feedback path from a secondary-side control circuit for controlling a pulse signal generator in a primarily control circuit.

There is an ongoing effort to replace conventional CCFL backlighting in large-screen LCD TVs with LED backlighting. LED backlighting provides many benefits. For example, the LED strings can be controlled separately instead of global dimming in a CCFL backlighting. Conventionally, a power conversion from an AC source to a DC source is required for the LED backlighting.

Some power converters use a diode rectifier followed by a bulk capacitor to convert an AC voltage to a DC voltage. These power converters often have a low power factor, which is defined as the ratio of the average power (consumed at the load) to the apparent power. One solution to improve the power factor is to add a filter for adjusting an AC source voltage to be in phase with a line current. The in-phase AC voltage is then applied to a resonant circuit that may include half bridge circuit having a pair of power switches to drive a resonant network.

Isolated AC to DC switched mode power supplies typically use a two-stage topology. The first stage serves the purpose of voltage transformation and isolation and outputs a sinusoidal current waveform with the help of a series resonance circuit to the primary winding of the isolation transformer. The second stage serves the purpose of providing a regulated output voltage and/or current to a load, e.g., a backplane lighting module. In general, a feedback circuit is interposed between the first stage and the second stage.

An example of a power supply system with a feedback circuit is shown in FIG. 1. A transformer T1 is interposed between a primary side circuit 110 and a secondary side circuit 120. Primary circuit 110 is coupled to a power source. An output of secondary circuit Vout is coupled to load circuit 130. A feedback circuit 125 provides a feedback signal related to the condition of the output on the secondary side and provides information regarding output condition to the control circuit at the first stage. The control circuit can use a pulse width modulation (PWM) control or a pulse frequency modulation (PFM) control. For example, the feedback circuit may generate an error voltage signal based on the actual voltage and the desired voltage at the output load.

In general, a PWM control circuit provides a large pulse width when the load is large, so that a constant output voltage can be maintained. A PFM control circuit maintains a constant voltage by maintaining a constant pulse width and but varying a pulse frequency, e.g., by increasing the pulse frequency when the load is large and by decreasing the pulse frequency when the load is small.

Although widely used, conventional power supply systems with feedback control tend to be complicated and expensive. Therefore, it is seen that more efficient and cost-effective techniques for improving power supply systems are highly desired.

BRIEF SUMMARY OF THE INVENTION

Embodiments of the present invention provide techniques for regulating voltages in a power supply for a backlighting system in applications such as LCD display panels. More particularly, some embodiments of the invention provide a power control system without using a feedback control signal from the secondary side of the transformer. Merely as an example, embodiments of the invention using resonant converter structures have been applied to an LED backlight system for LCD TVs. But it is appreciated that embodiments of the invention have much broader range of applications.

In an embodiment, a power supply system includes a transformer having a primary winding for coupling to a power source and a secondary winding. The power supply system also includes a first control circuit and a second control circuit. The first control circuit is coupled to the primary winding of the transformer and is configured to control a current flow in the primary winding without a feedback signal from the secondary winding. The second control circuit coupled to the secondary winding of the transformer and is configured to provide a regulated output voltage. In an embodiment, the second control circuit may include at least a pair of rectifier diodes. In another embodiment, the second control circuit may also include a voltage boost circuit. In an embodiment, the first control circuit may include a pair of power transistors, a pulse signal generator, and a driver circuit that turns on and off the pair of power transistors.

In another embodiment, the first control circuit may include an LLC resonant circuit. The LLC resonant circuit may include a resonant inductor and a resonant capacitor. In an embodiment, the pulse signal generator operates at a resonant frequency determined by the resonant inductor and the resonant capacitor. In an embodiment, the resonant inductor may be a leakage inductance integrated within the transformer.

In yet another embodiment, the first control circuit may be an asymmetrical half bridge circuit having a pair of power transistors that are turned on and off with non-equal duty cycles. In another embodiment, the asymmetrical half bridge circuit turns on and off the power transistors with substantially equal duty cycles. The power transistors operate in a complementary manner, i.e., one is turned off while the other one is turned on, and vice versa.

In an embodiment, a backlight system for a display device includes a transformer having a primary winding for coupling to a power source and a secondary winding. The backlight system also includes a first control circuit coupled to the primary winding of the transformer and a second control circuit coupled to the secondary winding of the transformer. The first control circuit is configured to control a current flow in the primary winding without a feedback signal from the secondary winding, and the second control circuit being configured to provide a regulated output voltage. The transformer galvanically separates the power source from the second control circuit. The backlight system further includes a backlight apparatus coupled to the second control circuit for receiving the regulated output voltage.

In an embodiment, the first control circuit may have an asymmetrical half bridge topology, which includes a pulse signal generator for turning on and off a pair of power transistors. In an embodiment, the pulse signal generator may operate at a constant frequency and provide two complementary switching signals that have substantially equal duty cycle. In another embodiment, the two complementary switching signals may have different duty cycles so that the pair of transistors may not the same turn-on and turn-off time duration period.

In an embodiment, the first control includes an LLC resonant circuit having a resonant capacitor and a resonant inductor. In another embodiment, the resonant inductor may be integrated into a single magnetic structure of the transformer.

A further understanding of the nature and advantages of the present invention may be obtained by reference to the remaining portions of the specification and the drawings.

DETAILED DESCRIPTION OF THE INVENTION

In embodiments of the present invention, a power supply system can be implemented without utilizing a feedback signal from the output. With such a system, the design can be simplified and the overall cost can be reduced. In the sections below, an example is first described below, followed by analysis of operating principles. Alternative design options are also described.

Figure 1:
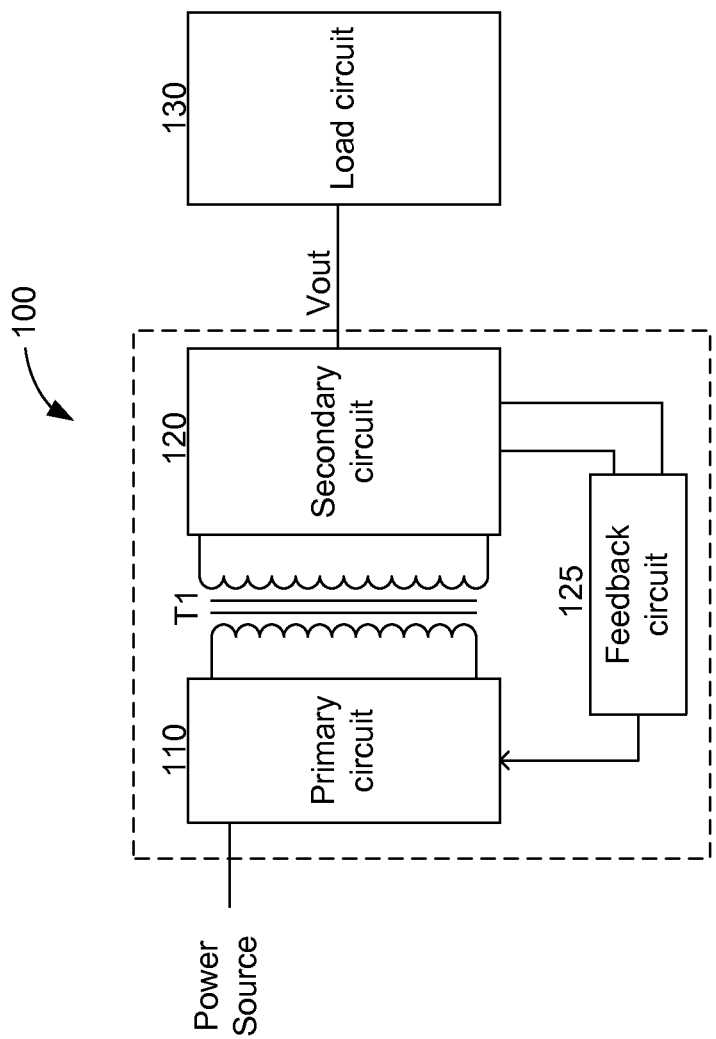
FIG. 1 is a block diagram of a conventional power control system including a feedback circuit.
Figure 2:
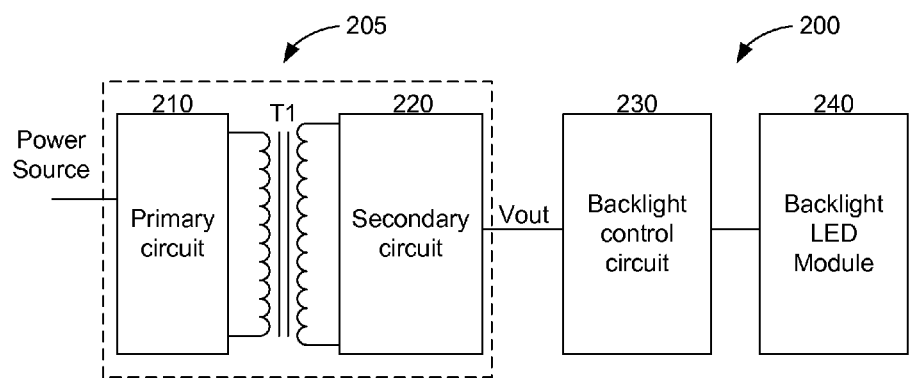
FIG. 2 is a simplified block diagram of an LED backlight system including a power supply system without a feedback circuit according to an embodiment of the present invention.

FIG. 2 is a simplified block diagram of an LED backlight system 200 including a power supply system 205 without a feedback circuit according to an embodiment of the present invention. Power supply system 205 comprises a primary control driver circuit 210, a secondary converter circuit 220, a transformer T1 that magnetically couples electrical energy from the primary control driver circuit to the secondary rectifier circuit. Backlight system 200 also includes a backlight control circuit 230 that is connected to the secondary rectifier circuit 220 to receive a regulated voltage Vout. Backlight control circuit 230 may convert the regulated voltage to a voltage appropriate to drive the LED strings for an LCD TV backlight module 240. In an embodiment of the present invention, power supply system 205 does not have a feedback path that provides status information of the regulated voltage Vout back to the primary control driver circuit. In other words, the primary drive control circuit 210 operates independently from the secondary converter circuit 220 and does not receive a feedback control signal from the secondary converter circuit. In an embodiment, the transformer T1 can be an integrated transformer including a primary winding and one or more secondary windings. In another embodiment, the transformer may include a plurality of individual magnetic coils.

Figure 3:
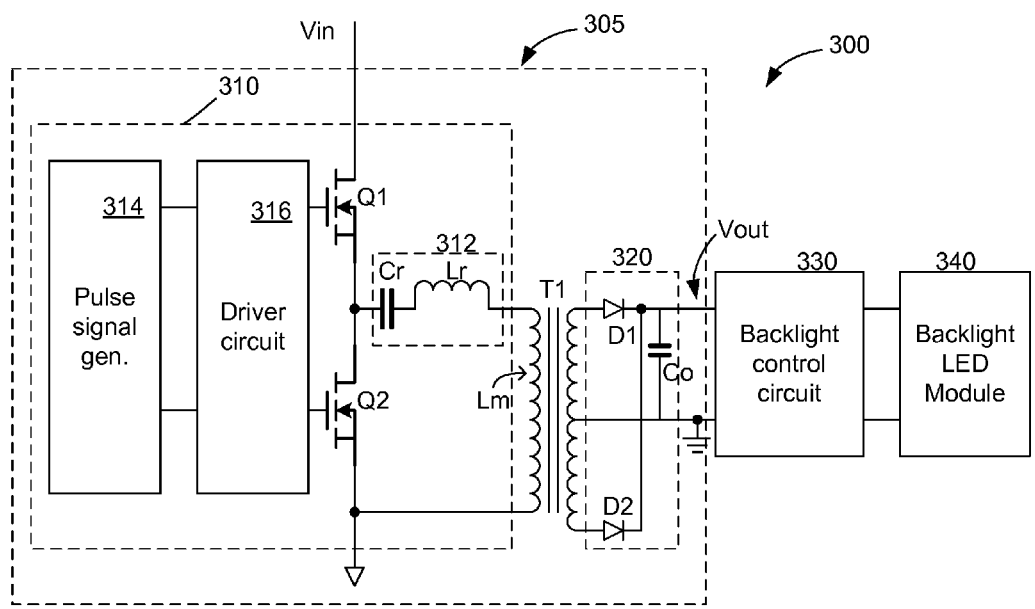
FIG. 3 is a simplified schematic/block diagram of an LED backlight system including a power supply system according to an embodiment of the present invention.

FIG. 3 is a simplified schematic/block diagram of an LED backlight system 300, which is a specific example of backlight system 200 of FIG. 2. As shown in FIG. 3, backlight system 300 includes a power supply system 305 that is implemented as an LLC resonant converter. Converter 305 can be used as the power supply system 205 without a feedback signal described above in connection with FIG. 2. An LLC resonant converter usually has a series resonant capacitor Cr, a series resonant inductor Lr, and a magnetizing inductor Lm. In transformer-based systems, magnetizing inductor Lm is usually provided by the transformer. Series resonant inductor Lr can be a separate inductor or, in some cases, provided by leakage inductance in the transformer.

As shown in FIG. 3, LLC resonant converter 305 includes a half bridge resonant circuit 310 coupled to an input voltage Vin. Half bridge resonant circuit 310 includes a resonant network 312, including a capacitor Cr and an inductor Lr, driven by a pair of power transistors Q1 and Q2, a pulse signal generator circuit 314, and a driver circuit 316 that turns power transistors Q1 and Q2 on and off. LLC resonant converter 305 further includes a transformer T1, which has a magnetizing inductance Lm, and a secondary side rectifier circuit 320 that receives magnetic energy from the half bridge circuit through the transformer. In addition, LLC resonant converter 305 includes a backlight control circuit 330 that is coupled to the rectifier circuit 320 and provides a regulated power supply and control signals to a backlight lighting module 340. Note that this specific embodiment of the present invention does not have a feedback circuit from the secondary circuit back to the resonant LLC half-bridge control circuit.

As described below, even though the primary side controller in LLC resonant converter 305 does not receive a feedback signal from the secondary side, a stable output can be provided. In some embodiments, backlight control circuit 330 on the secondary side of the transformer can include a PWM boost converter circuit for delivering constant currents to the backplane lighting module 340.

The switching frequencies of an LLC resonant converter may have two resonant frequencies determined by a series resonant capacitor Cr, a series resonant inductor Lr, and a magnetizing inductor Lm of a transformer. In addition to a first resonant frequency determined by Lr and Cr, the LLC converter may also operate at a second resonant frequency determined by Lr+Lm and Cr. For a given switching frequency and load, the LLC converter will operate under either a zero voltage switching (ZVS) condition or a zero current switching (ZCS) condition, depending on, among other things, the phase angle of the input impedance of the resonant tank circuit.

The two characteristic resonant frequencies fr1 and fr2 can be expressed in the following equations (1) and (2):

$$f_{r1} = \frac{1}{2\pi \cdot \sqrt{L_r \cdot C_r}} \qquad (1)$$

$$f_{r2} = \frac{1}{2\pi \cdot \sqrt{(L_r + L_m) \cdot C_r}} \quad (2)$$

In FIG. 3, the input to the half bridge circuit 310 is a DC voltage Vin. Transformer T1 has a primary side winding and two series secondary windings, and isolates the half-bridge circuit and the resonant network from secondary circuit 320.

In this embodiment, secondary circuit 320 includes a pair of rectifier diodes D1 and D2, each of which is connected to one of the two secondary windings for rectifying a half wave voltage. The half wave voltage is filtered by an output capacitor Co to produce an output voltage Vout.

LLC resonant half bridge converter 310 generates a constant output voltage V0 by turning on and off power switches that maybe implemented using power MOSFETs, e.g., Q1 and Q2. The tuning on/off of the power switches uses a pulse signal whose duty is adjustable at a fixed frequency when the resonant half bridge control circuit includes a PWM control circuit, or the frequency of the pulse signal is adjustable when the resonant half bridge control circuit includes a PFM control circuit.

Generally, the DC characteristics of the LLC resonant half bridge converter includes a zero voltage switching (ZVS) condition and a zero current switching (ZCS) condition. In operation, a first power switch is turned on so that a current linearly increases through the magnetizing inductor Lm, and the voltage across the magnetizing inductor Lm is thus constant (V=L*di/dt) and does not take part in the resonance. Because the magnetizing inductor Lm is not involved in the resonance, the current through the magnetizing inductor Lm is a sinusoidal waveform having a resonant frequency of fr1 of Equation (1). In other words, the LLC resonant components Cr and Lr form a filter that filters the harmonic currents and allow only the sinusoidal current to flow through even though a square-wave control signal is applied to the power switches.

Figure 4:
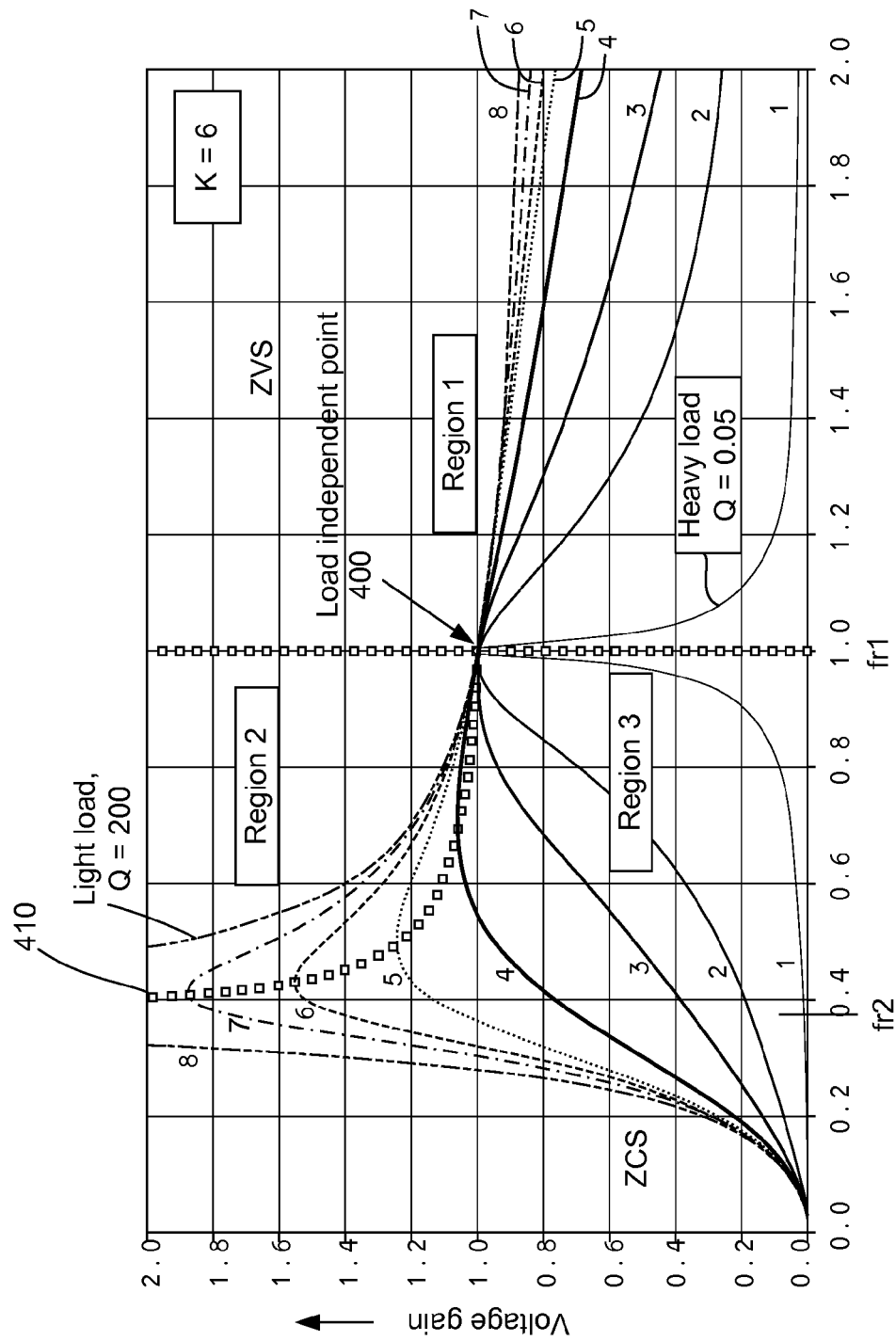
FIG. 4 is a diagram illustrating voltage gain curves of an LLC resonant converter as a function of the normalized switching frequency.

FIG. 4 is a diagram illustrating voltage gain curves of an LLC resonant converter as a function of the normalized switching frequency. The gain curves are given for an inductance ratio "k" of 6 ("k"=Lm/Lr) and for different quality factor Qs. Here, "k" is defined as the inductance ratio between the magnetizing and resonant inductances. Quality factor "Q" is defined as the ratio of the inductive reactance ($\sqrt{(L/C)}$) to the equivalent load resistance. In FIG. 4, different gain curves for k of 6 (Lm/Lr=6) are given as a function of the Q factor. Curve 1 is for a small Q of 0.05, i.e., the equivalent load is large, and curve 8 is for a large Q of 200 (for a light load). Other gain curves 2 to 7 are given for respective Q factors of 0.5 (curve 2), 1 (curve 3), 2 (curve 4), 3 (curve 5), 4 (curve 6), and 5 (curve 7).

The operating range of the LLC resonant converter is limited by the peak voltage gain (attainable maximum gain). It is noted that the peak voltage gains are somewhere between the two resonant frequencies fr1 and fr2. As quality factor Q increases, i.e., the equivalent load resistance decreases, the voltage gain moves towards resonant frequency fr2 (for a value of k=6, Fr2≈038*Fr1). And as Q decreases (the equivalent load increases), the peak voltage gain drops and moves towards resonant frequency fr1. Thus, the heavy load condition is often used as the worst case for the resonant network design. In FIG. 4, the peak gains are marked with a border line 310, above which the LLC resonant converter operates in the ZVS mode and below which the LLC resonant converter operates in the ZCS mode.

As shown in FIG. 4, the gain curves of an LLC resonant converter includes three regions:
 (1) region 1 on the right-hand side of the fr1 frequency,
 (2) region 2 between the fr1 frequency and the fr2 frequency and above the border line 410, and
 (3) region 3 that is on the left-hand side of the fr1 frequency and below the border line 410.

In region 1, the converter works as a series resonant converter. In this region, magnetizing inductor Lm does not resonate with resonant capacitor Cr and is clamped by the output voltage, i.e., magnetizing inductor Lm acts as a load of the series resonant tank. In region 2, the converter has an inductive behavior, i.e., magnetizing inductor Lm contributes partially to the resonant circuit. In region 3, the converter has a capacitive behavior.

The choice of the inductance ratio k and Q factor will affect the following characteristics of the LLC resonant converter:
 (1) the required operating frequency range of the converter;
 (2) the load range;
 (3) the type of the feedback and control circuit; and
 (4) the converter efficiency.

The Q factor is directly dependent on the load and can be determined from the Lr and Cr values under a full load condition. The higher the Q, the larger the range of the switching frequency is. To obtain a high Q, the equivalent load resistance must decrease. When Q is low, the gain characteristic of the LLC resonant converter will become a simple series resonant converter with the resonant frequency fr1.

The inductance ratio k determines the energy storage capacity of the magnetizing inductor. The higher the value of k, the lower the voltage gain, the lower the magnetizing current, and the larger the operating frequency range is.

Some embodiments of the invention implement the magnetic components Ls and Lm using an integrated transformer, where the leakage inductance is used as a series inductor Lr. The leakage inductance can have only a limited range of values because the integrated transformer is at first determined by the required turn ratio "a," then the Q factor is calculated by the required operating frequency fs. The k factor is then computed to ensure a required voltage gain.

In the embodiment of FIG. 3, pulse signal generator 314 of the half bridge resonant circuit 310 may operate at a constant frequency in the vicinity of the resonant frequency fr1 depicted in FIG. 4. In some embodiments, a constant duty cycle substantially equal to 50 percent can be used. Under this condition, the resonant frequency of an LLC resonant DC converter does not change with the load. The DC gain Gdc can be expressed as follows:

$$G_{dc} = \frac{1}{2a} \cdot \left| \frac{1}{1 + \frac{1}{k} \cdot \left(1 - \frac{f_{r1}^2}{f^2}\right) + j \cdot \left(\frac{f}{f_{r1}} - \frac{f_{r1}}{f}\right) \cdot Q} \right| = \frac{1}{2a} \quad (3)$$

where k is the ratio between the magnetizing inductance Lm and the series resonant inductance Lr (k=Lm/Lr), Q is the quality factor, and "a" is the transformer turns ratio. That is, for a given turns ratio of the transformer, the gain curve is constant.

As described above, the pulse signal generator may operate without receiving any feedback information from the secondary side of the transformer. Embodiments of the present invention makes use of the property that the voltage gain remains approximately the same regardless of the value of the Q factor at the load independent point 400 as shown in FIG. 4.

In some embodiments, when the input voltage Vin is high, the pulse signal generator may operate at the resonant frequency fr1, which is the resonant frequency of the series resonant tank. In the case where the input voltage Vin is low, the operating frequency of the pulse generator may be set lower to achieve a higher voltage gain, as shown in FIG. 4. Thus in embodiments of the invention, the operating frequency of the pulse signal generator can have a predetermined value and does not depend from the feedback signal that derives from the rectified voltage on the secondary side, as in the case of conventional resonant converters.

In practical applications in large-screen LCD and plasma display panel (PDP) TVs, the operating frequency of the LLC resonant converter may not be able to remain at the resonant frequency due to parasitic parameters and the variation in the input voltage. As a result, the output voltage may have variations. In this case, TV sets and backplane projection display products may use a boost converter on the secondary side of the transformer in the LLC half bridge resonant converter, and the power supply system still exhibits good power performance.

In order to be able to use a low-cost pulse signal generator for controlling the power transistors Q1 and Q2, a driver circuit may be required. In an embodiment, the driver circuit can be a transformer driver. In another embodiment, the drive circuit can be a silicon integrated circuit driver. These driver design options are discussed in more detail below.

Figure 5:
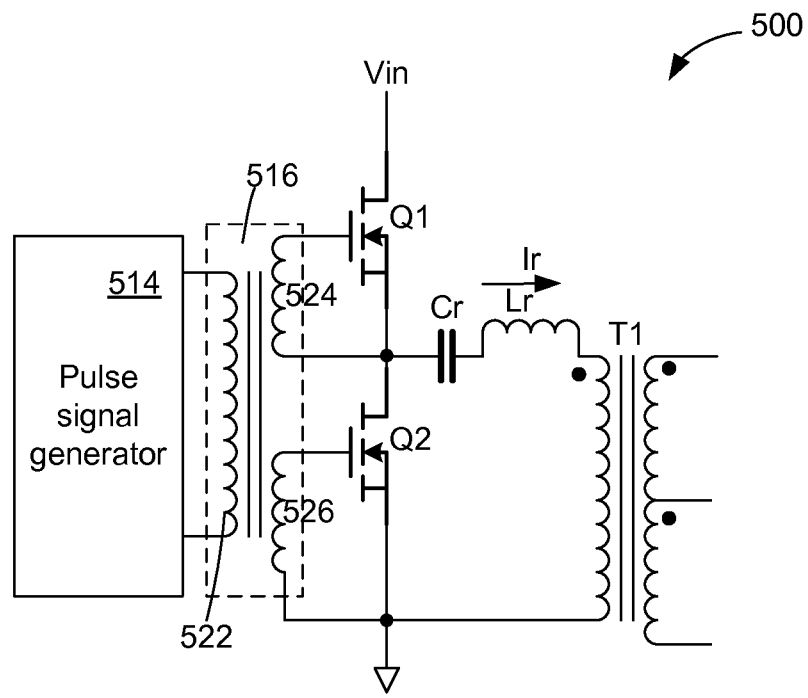
FIG. 5 is a simplified schematic diagram of an LLC half bridge resonant converter driven by a transformer according to an embodiment of the present invention.

FIG. 5 is a simplified schematic diagram illustrating part of an LLC half bridge resonant converter 500 driven by a transformer according to an embodiment of the present invention. Converter 500 includes a pulse signal generator 514 and a transformer 516 that is electrically driven by the pulse signal generator. In an embodiment, transformer 516 includes a primary winding 522, a first secondary winding 524, and a second secondary winding 526. Converter 500 further includes power transistors Q1 and Q2 that are connected in series between an input voltage Vin and a ground. Transistors Q1 and Q2 are connected to the respective first and second secondary windings 524 and 526 as shown in FIG. 5. In operation, primary winding 522 receives an electrical pulse from pulse signal generator 514 and induces a first voltage at the first secondary winding 524 and a second voltage at the second secondary winding 526. The first and second induced voltages are opposite in phase, so that when transistor Q1 is turned on, transistor Q2 is turned off, and vice versa. A series resonant network Cr and Lr will deliver a quasi-sinusoidal current Ir to the converter transformer T1 as described in above section. It is noted that there is no feedback signal provided either to the pulse signal generator or to transformer 516 from a secondary side of transformer T1 (not shown).

Figure 6:
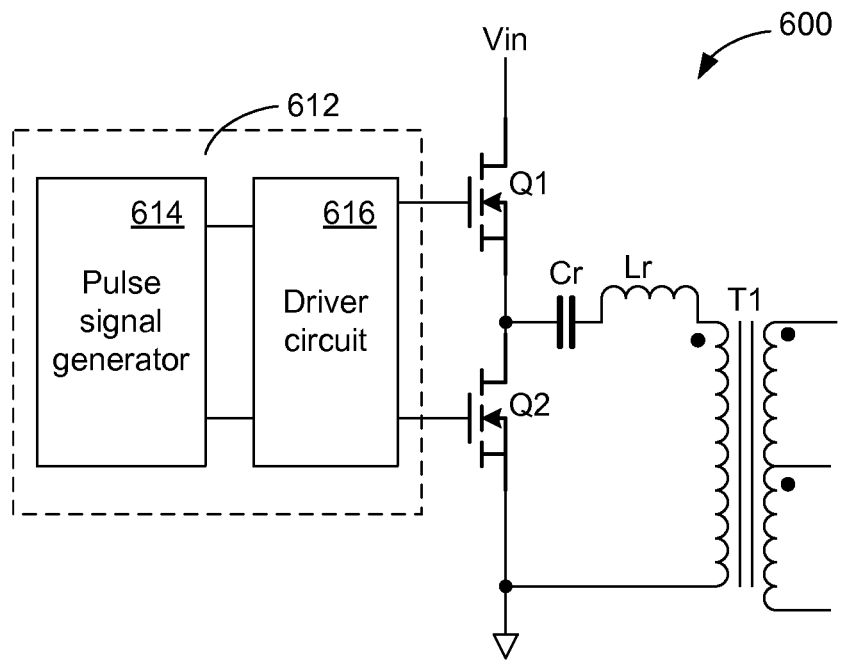
FIG. 6 is a simplified schematic diagram of an LLC half bridge resonant converter driven by an integrated circuit according to an embodiment of the present invention.

FIG. 6 is a simplified schematic diagram of part of an LLC half bridge resonant converter driven by an integrated circuit according to an embodiment of the present invention. As shown in FIG. 6, converter 600 has an integrated circuit driver device 612 includes a pulse signal generator 614 and a driver circuit 616. In an embodiment, pulse signal generator 614 and driver circuit 616 may be implemented as a single integrated circuit for driving power transistors Q1 and Q2. In an embodiment, power transistors Q1 and Q2 may also be integrated into a single integrated circuit driver device. As shown, integrated circuit driver device 612 is configured to operate at a frequency close to the resonant frequency determined by the series resonant network Cr and Lr and does not require any feedback information signal from the secondary side of transformer T1, such as a secondary rectifier or a voltage regulator circuit.

Figure 7:
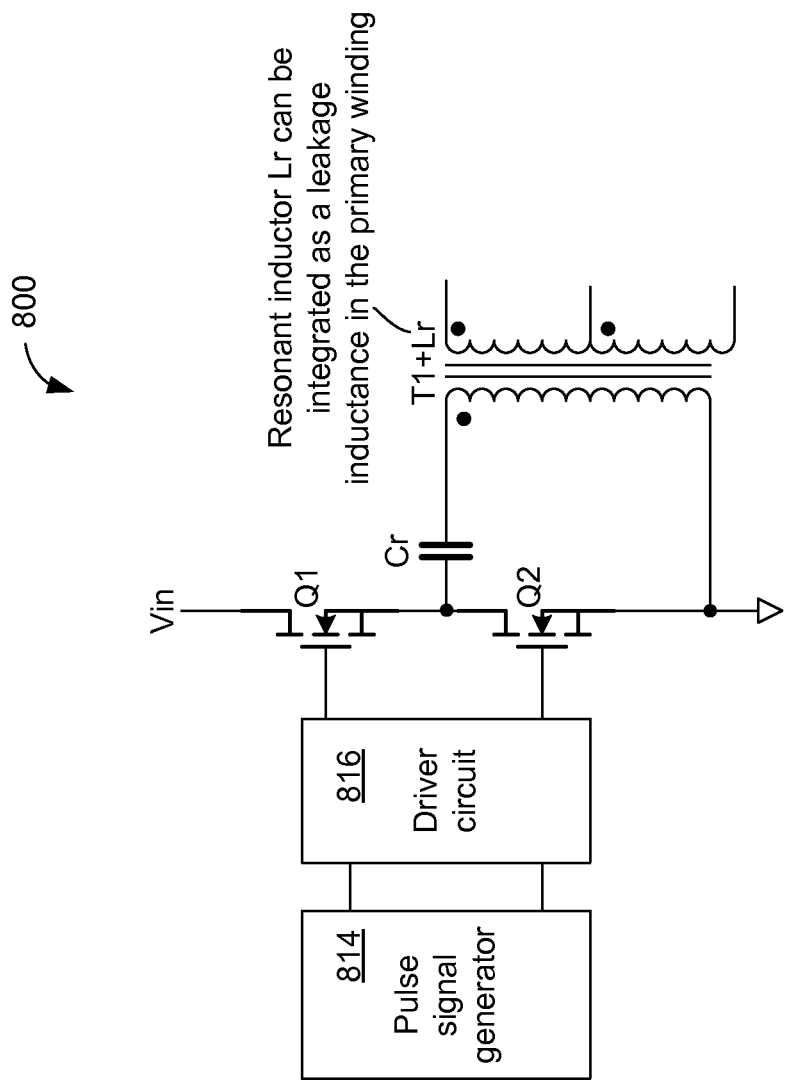
FIG. 7 is a simplified schematic diagram of an alternative realization of the resonant inductance of the LLC resonant converter according to an embodiment of the present invention.

FIG. 7 is a simplified schematic diagram of an alternative realization of a resonant power converter 800 according to an embodiment of the present invention. Resonant power converter 800 includes a pulse signal generator 814 that turns a pair of power transistors Q1 and Q2 on and off through a driver circuit 816. In this embodiment, the series inductor Lr can be obtained from a leakage inductance of the primary inductance of the transformer T1. In this case, the series resonant inductor can be omitted.

Figure 8:
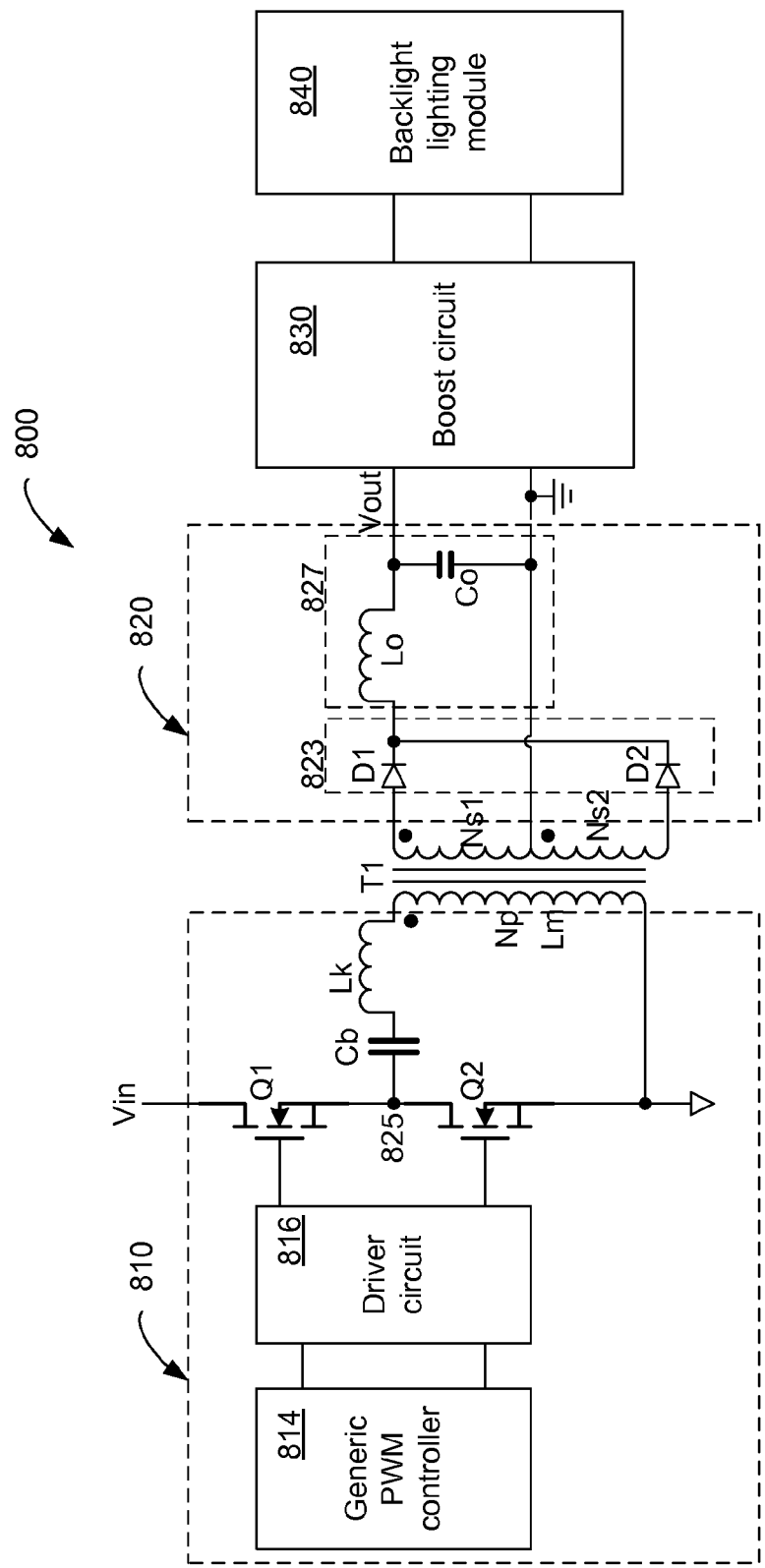
FIG. 8 is a simplified schematic diagram of a backlight system according to an alternative embodiment of the present invention.

FIG. 8 is a simplified schematic diagram of backlight system 800 according to an embodiment of the present invention. As shown in FIG. 8, backlight system 800 includes a primary side circuit 810, a secondary circuit 820, and a transformer T1. In some embodiments, backlight system 800 can include a boost circuit 830 coupled to a backlight lighting module 840. Primary circuit 810 includes a PWM controller 814 and a driver circuit 816. In an embodiment, driver circuit 816 can include a transformer as shown in FIG. 5 and described in detail in the associated section. In another embodiment, the driver circuit can be realized as a silicon integrated circuit and/or integrated together with PWM generator 814 in a single semiconductor chip.

In FIG. 8, primary side circuit 810 includes a pair of MOSFET switches Q1 and Q2 connected in series between an input dc voltage Vin and ground. A resonant network formed with a resonant capacitor Cb and a series resonant inductance Lk is connected to a common node 825 between transistors Q1 and Q2. The resonant network converts the square waveform of the input dc voltage Vin received from either Q1 or Q2 into a sinusoidal waveform voltage.

Backlight system 800 also includes a center-tapped transformer T1 that includes primary winding having a primary winding Np and associated magnetizing inductance Lm, and a first secondary winding Ns1 and a second secondary winding Ns2. The center-tapped transformer T1 transfers the sinusoidal voltage through the first and second windings Ns1 and Ns2 to a secondary rectifier circuit 823 having diodes D1 and D2 for rectifying an induced sinusoidal voltage in the secondary windings into a positive rectified voltage signal that is then filtered by a filter 827. Filter 827 may include an inductor Lo and a capacitor Co and produce a filtered voltage Vout. In yet another embodiment, the leakage inductor can be implemented into a single magnetic structure of the transformer T1. Boost circuit 830 receives the filtered voltage Vout and generates the required operating voltages for a backlight module 840 for a flat panel LCD or plasma display panel. Depending on the embodiment, backlight module can include one or more LED lighting devices.

In FIG. 8, power MOSFETs Q1 and Q2 are turned on and off by driver circuit 816 that receives control signals from generic PWM controller 814. In an embodiment, the PWM controller may generate two complementary switching signals to the power MOSFETs Q1 and Q2. The complimentary switching signals may have substantially equal duty cycles. In another embodiment, when the input voltage Vin is high, the PWM controller may operate at the resonant frequency of the series resonant network formed by Cb and Lk.

In yet another embodiment, the PWM controller generates two asymmetrical switching signals having a first duty cycle D for MOSFET Q1 and a second duty cycle (1-D) for MOSFET Q2.

In some embodiments, an asymmetric half bridge converter may be suitable for use in low-power DC/DC zero voltage switching (ZVS) converter operation. The asymmetric half-bridge converter achieves zero voltage switching by using a fixed dead zone in the complementary driver control signals. The asymmetric half bridge converter and the LLC half bridge resonant converter may operate in a similar manner. However, due to the asymmetrical duty cycle, the asymmetric half bridge converter may not have the characteristics of a constant gain curve as that of the LLC half bridge resonant converter when operating at a fixed resonant frequency and at a fixed duty cycle of close to 50 percent, so that the output regulation is not as good as that of the LLC half bridge resonant converter. When the asymmetric half bridge converter receives its input voltage from a PFC circuit, and when the inductance Lk is operating in the continuous conduction mode (CCM), the gain curve of the asymmetric half bridge converter can be expressed as follows:

$$G_{dc} = \frac{2D \cdot (1-D)}{a} \quad (4)$$

where D and (1-D) are the respective duty cycles of Q1 and Q2, and a is the transformer turns ratio. For a given turns ration "a", the gain is proportional to the duty cycle up to 50% and inversely proportional to the duty cycle when it is over 50%. Because of this symmetry, the gain curve is maximum at the 50% duty cycle. Hence, the gain curve of the asymmetric half bridge converter is constant when operating in the CCM mode.

When operating in the discontinuous conduction mode (DCM), the gain curve of the asymmetric half bridge converter can be expressed as:

$$G_{dc} = \frac{1}{a} \cdot \frac{KD - D^2(1-2D) + D \cdot \sqrt{K^2 - 2K(1-2D)(3D-2) + D^2 \cdot (1-2D)^2}}{2K}, \quad (5)$$

where $$K = \frac{2L_o \cdot f}{R} \quad (6)$$

Based on Equations (5) and (6), it can be seen that, as the output load decreases to a certain level, the output voltage will increase. In some embodiments, an asymmetric half bridge converter can include a boost circuit to make up for the imperfect regulation of the asymmetric half bridge converter.

Figure 9:
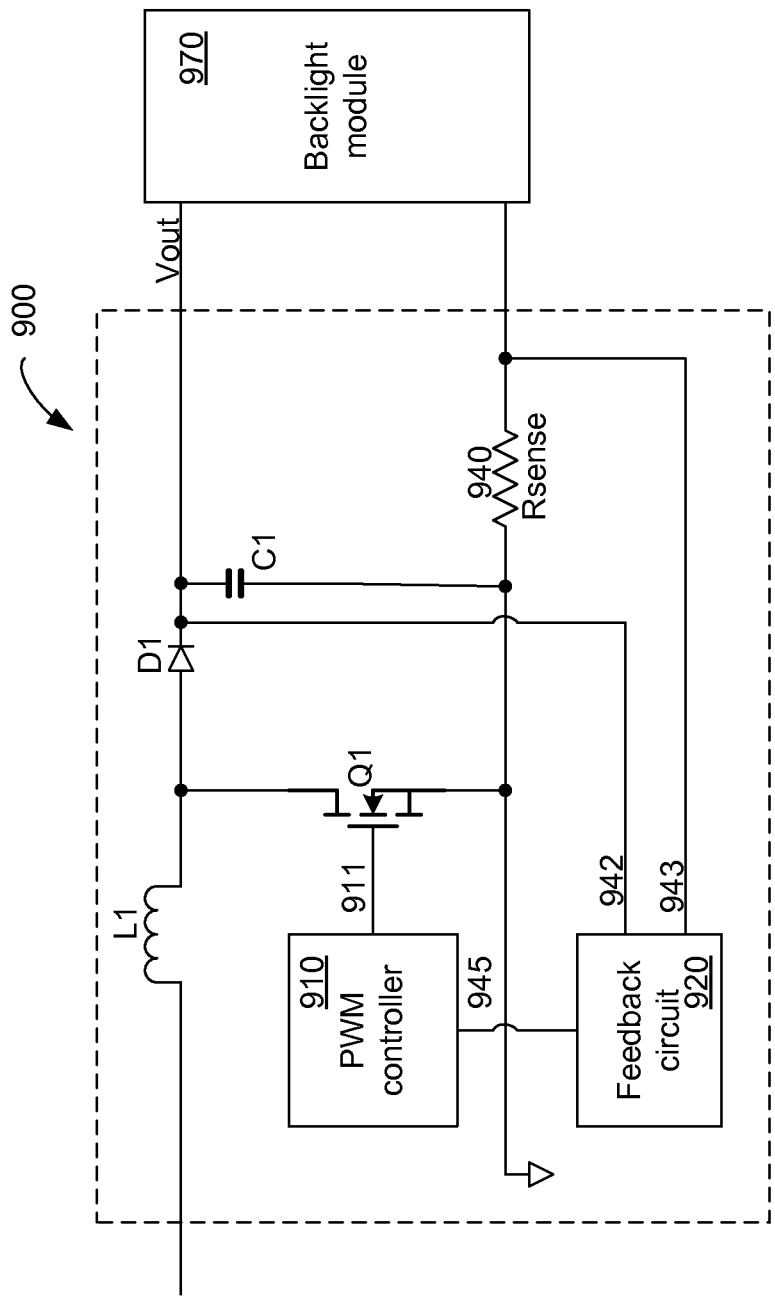
FIG. 9 is a simplified schematic diagram of a PWM boost converter that may be used in a second control circuit according to an embodiment of the present invention.

FIG. 9 is a simplified schematic diagram of a boost converter circuit 900 that may be used as the boost circuit 830 of FIG. 8 according to an embodiment of the present invention. Boost converter circuit 900 includes a conventional PWM controller 910 that provides control signal 911 to a power transistor Q1. Inductor current is sensed by a low value resistor Rsense that is located in the return path of the boost converter. One side of Rsense is coupled to a backlight module 970 and the other side of Rsense is connected to a system ground. Rsense can also be used to detect an overload condition such as a short circuit. A feedback circuit 920 receives voltage signals 942 and 1043 and generates a feedback signal 945 to the PWM controller. PWM controller 910 compares feedback signal 945 with a periodic voltage ramp to generate a pulse width modulated output to control transistor Q1.

As described above, embodiments of the asymmetric half bridge controller according to the present invention do not require a feedback circuit. As shown in FIG. 8, PWM controller 814 can operate with a constant pulse width having a predetermined duty cycle and a predetermined operating frequency. In certain embodiments, the operating frequency can be at the proximity of the series resonant frequency that is substantially load independent as shown in FIG. 4. In a preferred embodiment, the PWM controller together with the resonant circuit (Cb, Lk) and transformer T1, rectifier circuit 823, and the low-pass filter circuit 827 can provide a regulated DC voltage Vout independently of the load, i.e., without receiving any feedback information from the output load. If needed, the load variation can be handled by the boost converter circuit. An efficient and cost-effective power supply system can thus be realized.

It is understood that the examples and embodiments described herein are for illustrative purposes only and that various modifications or changes in light thereof will be suggested to persons skilled in the art and are to be included within the spirit and purview of this application.

What is claimed is:

1. A power supply system, comprising: a transformer having a primary winding on its primary side for coupling to a power source and one or more secondary windings on its secondary side; a first control circuit disposed on the primary side of the transformer for controlling a current flow in the primary winding, the first controller including a pulse-width modulation (PWM) control circuit configured to operate with 50% duty cycle at a frequency for maximum voltage gain for a given load condition; and a second control circuit disposed on the secondary side of the transformer, the second control circuit being configured to provide a regulated output voltage; wherein the first control circuit is configured to generate a control signal for controlling the current flow in the primary winding without using a feedback control signal from the secondary side of the transformer.

2. The power supply system of claim 1, wherein the first control circuit comprises an LLC resonant circuit.

3. The power supply system of claim 2, wherein the LLC resonant circuit comprises a leakage inductance provided by the transformer.

4. The power supply system of claim 1, wherein the first control circuit comprises an asymmetric half bridge circuit.

5. The power supply system of claim 1, wherein the first control circuit comprises a second transformer coupled between a pulse signal generator and two transistors.

6. The power supply system of claim 1, wherein the first control circuit comprises an integrated circuit that is configured to provide a pulsed control signal.

7. A backlight system for providing backlight to a display device, the backlight system comprising:
a transformer having a primary winding on its primary side for coupling to a power source and one or more secondary windings on its secondary side;
a first control circuit disposed on the primary side of the transformer for controlling a current flow in the primary winding; and
a second control circuit disposed on the secondary side of the transformer, the second control circuit being configured to provide a regulated output voltage; and
a backlight apparatus that includes one or more light devices;
wherein the first control circuit is configured to generate a control signal for controlling the current flow in the primary winding without using a feedback control signal from the secondary side of the transformer;
wherein the second control circuit comprises a pulse width modulated (PWM) control circuit.

8. The backlight system of claim 7, wherein the backlight apparatus comprises one or more light emitting diode (LED) devices.

9. The backlight system of claim 7, wherein the first control circuit comprises an LLC resonant circuit.

10. The backlight system of claim 9, wherein the LLC resonant circuit comprises a resonant inductor and a resonant capacitor.

11. The backlight system of claim 7, wherein the second control circuit is configured to receive a feedback signal from the backlight apparatus.

12. The backlight system of claim 7, wherein the second control circuit comprises a voltage boost circuit.

13. The backlight system of claim 7, wherein the first control circuit comprises a first power switch and a second power switch having substantially the same duty cycle.

14. The backlight system of claim 7, wherein the first control circuit comprises an asymmetric half bridge circuit.

15. The backlight system of claim 7, wherein the first control circuit comprises a first power switch and a second power switch having complementary duty cycles, D and 1-D, respectively.

16. A power supply system, comprising: a transformer having a primary winding on its primary side for coupling to a power source and one or more secondary windings on its secondary side; a first control circuit disposed on the primary side of the transformer for controlling a current flow in the primary winding, the first controller including an LLC resonant circuit, the first controller including a pulse width modulated (PWM) control circuit configured to operate at a frequency for a peak voltage gain for a target load condition; and a second control circuit disposed on the secondary side of the transformer, the second control circuit being configured to provide a regulated output voltage; wherein the first control circuit is configured to generate a control signal for controlling the current flow in the primary winding without using a feedback control signal from the secondary side of the transformer.

17. The power supply system of claim 16, wherein the first controller further comprises an LLC resonant circuit including a resonant inductor and a resonant capacitor.

18. The power supply system of claim 17, wherein the first controller includes a pulse width modulated (PWM) control circuit configured to operate at a frequency that is lower than a first frequency fr1 and higher than a second frequency fr2, wherein $$f_{r1} = \frac{1}{2\pi \cdot \sqrt{L_r \cdot C_r}} \text{ and}$$

$$f_{r2} = \frac{1}{2\pi \cdot \sqrt{(L_r + L_m) \cdot C_r}}$$

wherein Cr is the capacitance of the resonant capacitor, Lr is the inductance of the resonant inductor, and Lm is a magnetizing inductance Lm of the transformer.

19. The power supply system of claim 16, wherein the pulse width modulated (PWM) control circuit is configured to operate at a substantially 50% duty cycle.

20. The power supply system of claim 16, wherein the second control circuit comprises a pulse width modulated (PWM) control circuit.

* * * * *